US010951408B2

(12) United States Patent
Li et al.

(10) Patent No.: US 10,951,408 B2
(45) Date of Patent: Mar. 16, 2021

(54) METHOD AND SYSTEM FOR PUBLICLY VERIFIABLE PROOFS OF RETRIEVABILITY IN BLOCKCHAINS

(71) Applicant: NEC Laboratories Europe GmbH, Heidelberg (DE)

(72) Inventors: Wenting Li, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 16/121,706

(22) Filed: Sep. 5, 2018

(65) Prior Publication Data

US 2020/0076603 A1 Mar. 5, 2020

(51) Int. Cl.

| | |
|---|---|
| *H04L 9/32* | (2006.01) |
| *G06F 16/27* | (2019.01) |
| *G06F 16/182* | (2019.01) |
| *H04L 29/06* | (2006.01) |

(52) U.S. Cl.
CPC .......... *H04L 9/3218* (2013.01); *G06F 16/182* (2019.01); *G06F 16/27* (2019.01); *H04L 9/3271* (2013.01); *H04L 63/123* (2013.01); *H04L 2209/38* (2013.01)

(58) Field of Classification Search
CPC ... H04L 9/3218; H04L 9/3271; H04L 63/123; H04L 2209/38; H04L 63/12; G06F 16/27; G06F 16/182
See application file for complete search history.

(56) References Cited

U.S. PATENT DOCUMENTS

| | | | | |
|---|---|---|---|---|
| 8,984,363 | B1 * | 3/2015 | Juels | G06F 21/64 |
| | | | | 714/752 |
| 2017/0126684 | A1 * | 5/2017 | Armknecht | H04L 63/123 |
| 2018/0191502 | A1 * | 7/2018 | Karame | H04L 9/0825 |
| 2018/0198794 | A1 * | 7/2018 | Huh | G06Q 30/08 |
| 2018/0349617 | A1 * | 12/2018 | Wang | H04L 9/3239 |
| 2019/0268142 | A1 * | 8/2019 | Leker | H04L 63/126 |
| 2019/0303622 | A1 * | 10/2019 | Versteeg | H04L 9/3239 |
| 2019/0305968 | A1 * | 10/2019 | Versteeg | H04L 9/3239 |
| 2020/0067697 | A1 * | 2/2020 | Puddu | G06F 16/9027 |
| 2020/0082101 | A1 * | 3/2020 | Kim | G06F 21/72 |
| 2020/0097951 | A1 * | 3/2020 | Abramson | H04L 9/0637 |
| 2020/0099537 | A1 * | 3/2020 | Karame | H04L 9/0869 |

(Continued)

FOREIGN PATENT DOCUMENTS

WO    WO 2018/172439 A1 *    9/2018    ............. G06Q 20/02

OTHER PUBLICATIONS

Bruno Produit, "Using Blockchain Technology in Distributed Storage Systems", Jun. 10, 2018, Institute of Computer Science University of Tartu, p. 1-14.*

(Continued)

*Primary Examiner* — Christopher A Revak
(74) *Attorney, Agent, or Firm* — Leydig, Voit & Mayer, Ltd.

(57) ABSTRACT

A method for securing a blockchain and incentivizing the storage of blockchain data using a publicly verifiable proof of retrievability (PoR) includes receiving a PoR transaction having a PoR proof; determining whether the PoR proof is a verified PoR proof; and based upon determining that the PoR proof is a verified PoR proof, incorporating, by a block creator node, the PoR transaction into a new block of the blockchain.

13 Claims, 4 Drawing Sheets

(56) References Cited

U.S. PATENT DOCUMENTS

2020/0104809 A1* 4/2020 Destefanis ................ H04L 9/32
2020/0106605 A1* 4/2020 Mord .................... H04L 9/3297

OTHER PUBLICATIONS

Li et al, "IPOR: An efficient IDA-based proof of retrievability scheme for cloud storage systems", 2017, IEEE ICC 2017 SAC Symposium Big Data Networking Track, p. 1-6.*
Bowers et al, "Proofs of Retrievability: Theory and Implementation", Nov. 13, 2009, CCSW'09, p. 43-53.*
Chepurnoy, et al. "A Prunable Blockchain Consensus Protocol Based on Non-Interactive Proofs of Past States Retrieability," (Apr. 7, 2016): 1-8. XP055624084.
Vorick, et al. "Sia: Simple Decentralized Storage," (Nov. 29, 2014): 1-8. XP055609039.
Sengupta, et al. "Retricoin: Bitcoin Based on Compact Proofs of Retrievability," *Distributed Computing and Networking* (Jan. 4, 2016): 1-10. XP058078830.
Miller, et al. "Permacoin: Repurposing Bitcoin Work for Data Preservation," 2014 IEEE Symposium on Security and Privacy (May 18, 2014): 1-16. XP032686147.

* cited by examiner

METHOD AND SYSTEM FOR PUBLICLY VERIFIABLE PROOFS OF RETRIEVABILITY IN BLOCKCHAINS

FIELD

The present invention relates to a method and system for publicly verifiable proofs of retrievability in blockchains.

BACKGROUND

Blockchain systems are a type of distributed database management systems that allow for data (e.g., a digital ledger including transactions and metadata) to be securely and reliably recorded, shared, and synchronized across a distributed network of different network participants (e.g., nodes). Blockchain technology uses a particular type of data structure that facilitates the storage and distribution of data in packages called "blocks" that are digitally connected to each other in a "chain." Blockchain systems provide a decentralized, open, Byzantine fault-tolerant transaction mechanism.

Blockchain systems are becoming common for various types of Internet interactions, including anonymous online payments, remittance, and the transaction of digital assets (e.g., digital currencies). Cryptocurrencies (a type of digital currency), such as those provided by the Bitcoin, Litecoin, Dogecoin, or Ethereum platforms, are well-recognized examples of blockchain systems.

With the increasing popularity of blockchain, thousands of nodes join the blockchain network to issue and validate transactions. Given the current transaction volume and the lack of proper pruning mechanism in public blockchains, blockchain nodes face big challenges to host the full blockchain. For example, at present it requires 170 GB for Bitcoin and 75 GB for Ethereum to store the entire blockchain.

As a result of the significant blockchain storage requirements, and with the constantly growing demand for blockchain storage, fewer and fewer nodes store the full blockchain locally. Indeed, most of the blockchain nodes become lightweight clients who utilize the infrastructure but not contribute to it (e.g., do not store the full blockchain). Also contributing to the reduction of blockchain storage is the prevalence of mining pools, where nodes are incentivized to become mining nodes, which do not necessarily need to maintain the whole blockchain in order to mine a block. In fact, only the mining pool coordinators are left to be the full nodes, storing the full blockchain. Changes in blockchain protocols are also leading to fewer nodes storing the whole blockchain; for example, recent bitcoin releases (e.g., Bitcoin, 2015) enables pruning old blocks to reduce the storage requirements.

As a result, there is a shortage of trusted data storage of the whole blockchain, which is a serious threat to the security and sustainability of the blockchain system. For example, because the complete blockchain data is important for a node to validate transactions and detect possible double-spending transactions, it is critical for the blockchain system to have a certain number of full copies of the blockchain in case some of them are corrupted (or compromised) and to prevent invalid transactions from being included in the ledger. Yet, conventional blockchain systems do not effectively incentivize the nodes to store the whole blockchain, and thus serious security threats are left unaddressed.

In fact, even fairly recent advancements in blockchain technologies fail to address the blockchain storage problem.

For example, SmartLight (see Damian Gruber, Wenting Li, Ghassan Karame, "Unifying Lightweight Blockchain Client Implementations", In Proceedings of the NDSS Workshop on Decentralized IoT Security and Standards (NDSS-DISS), San Diego, Calif., USA, 2018, the entire contents of which is hereby incorporated by reference herein) proposes a framework to motivate full nodes (that serve lightweight clients) to forward transactions of their interests. SmartLight leverages the smart contract scheme to reach a fair payment contract between the light clients and the full nodes. However, SmartLight does not require participation as a full node (i.e., a node that stores the whole blockchain) to benefit from the payment scheme. In fact, a node can delete a received block after it has forwarded the transactions to the clients; thus SmartLight does not encourage storage of the full blockchain.

EWoK (Entangled proofs of WOrk and Knowledge) (see Armknecht, Frederik, Jens-Matthias Bohli, Ghassan O. Karame, and Wenting Li, "Sharding PoW-based Blockchains via Proofs of Knowledge," semanticsscholar.org, the entire contents of which is incorporated by reference herein) is a proposal to combine blockchain sharding with the mining protocol: Proof of Work (PoW). EWoK improves the hash-based PoW puzzle, so that each mining node needs to store part of the blockchain in order to successfully solve the puzzle and generate a block. EWoK, however, is in the setting of a mining pool, where only the pool coordinator knows which partition of the blockchain each mining node stores, and the PoW solution is only verifiable by the pool coordinator. However, as discussed above, mining pools do not incentivize maintaining multiple copies of the blockchain. Instead, they focus on investing computation resources to solve the PoW solution.

Filecoin (see filecoin.io, 2014) proposes using proofs of retrievability in the blockchain as a proof of storage for a distributed file system that is built on top of the blockchain. In Filecoin, the proofs are over the contiguous stored filed pieces with a fixed size. Also, Filecoin only requires that miners in a mining pool give a proof while creating a block; and thus does not address the problem of their being decreasing few copies of the full blockchain data in a network because it is limited to mining pools, of which there are only a few on a network.

SUMMARY

An embodiment of the present invention provides a method for securing a blockchain and incentivizing the storage of blockchain data using a publicly verifiable proof of retrievability (PoR) that includes receiving a PoR transaction having a PoR proof; determining whether the PoR proof is a verified PoR proof; and based upon determining that the PoR proof is a verified PoR proof, incorporating, by a block creator node, the PoR transaction into a new block of the blockchain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
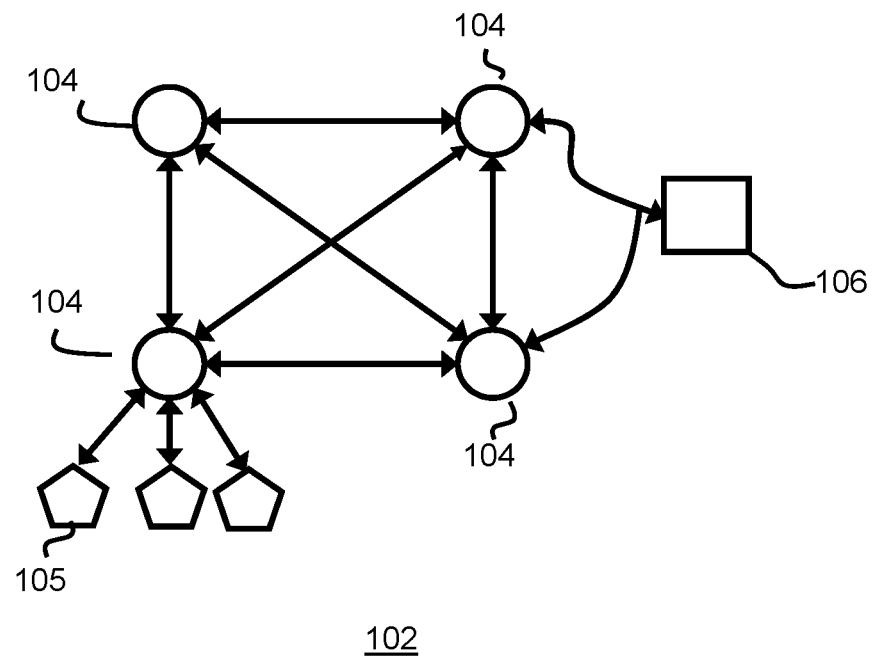
FIG. 1 illustrates a blockchain network according to an embodiment of the present invention.

Embodiments of the present invention solve problems rooted in computer-implemented blockchain systems, including system security and sustainability problems arising from insufficient copies of the whole blockchain being stored on the network. Embodiments provide an incentive scheme for nodes of a blockchain network to store the blockchain by rewarding providing public and outsourced verifiable proofs of retrievability (PoR) of the blockchain.

For example, an embodiment of the present invention provides a method that improves storage of blockchains using publicly verifiable PoR, which includes the following: extending the blockheader of a block with the PoR authentication tags computed over the block; deriving individual PoR challenges based on the latest block and the account of each full node; generating PoR proofs over the challenged blocks and grouping the blocks if generated by the same node (e.g., the same miner); embedding the PoR proofs in transactions and enabling nodes to claim rewards if the PoR transactions are validated and included in a newly mined block; and regulating the number of blockchain replicas in the network by adjusting the maximum number of PoR transactions that shall be included in a block.

In an embodiment, block creators generate an authentication tag of a created block based on a public verification construction of PoR, and the full nodes generate proofs based on the chain data and the tags of each block. Validated proofs are included in a block as PoR transactions, which can be used by the full nodes to claim their reward.

In an embodiment, a node is rewarded with mined cryptocoins (or a portion thereof) if correct PoRs are included in a generated block. This is a departure from conventional blockchain systems, where only the mining node that invests computation resources to generate the blocks are rewarded when a block is accepted. In embodiments, the generated blocks are required to additionally include a certain number of PoRs of the whole blockchain. Nodes that provide such correct proofs are eligible to gain an extra reward. Thus, the nodes are incentivized to store the whole blockchain, which leads to more copies being stored on the network, which in turn solves the security and reliability problems that arise when insufficient copies of the blockchain are stored. Embodiments provide proofs to the blockchain data itself over randomly selected blocks with variable size.

In an embodiment, a method for securing a blockchain and incentivizing the storage of blockchain data using a publicly verifiable proof of retrievability (PoR) is provided that includes receiving a PoR transaction having a PoR proof; determining whether the PoR proof is a verified PoR proof; and based upon determining that the PoR proof is a verified PoR proof, incorporating, by a block creator node, the PoR transaction into a new block of the blockchain.

The PoR transaction may further have a PoR account identifier. And, the method may further include: proposing the new block to a blockchain network, the blockchain network having a reward protocol that provides a reward to an account corresponding to the PoR account identifier included in the new block based upon the new block being accepted by the blockchain network and included in the blockchain.

The method may include incorporating a PoR authentication tag in a block header of the new block. Here, the PoR authentication tag may be generated using a private key of the block creator node, a vector of public random elements, and data of the new block. The vector of public random elements may be generated by a pseudo-random number generator using a public key of the block creator node as its seed.

In an embodiment, the verified PoR proof is verified using a PoR verification method, which includes: generating a hash based on a last block header and a PoR account identifier, the PoR account identifier being associated with a PoR node that generated the PoR transaction; generating a challenge vector by executing a pseudo-random number generator using the hash as its seed; retrieving PoR authentication tags of the challenged block headers according to the challenge vector; sorting PoR authentication tags of the challenged block headers into groups according to block creator accounts; and for each of the groups, verifying PoR based on an associated PoR proof and an associated public key of a corresponding one of the block creator accounts.

In an embodiment, the PoR transaction may be generated by a PoR generation method that includes: retrieving blockchain data associated with the blockchain stored by a PoR creator node; generating a hash based on a last block header and a PoR account identifier of the PoR creator node; generating a challenge vector by executing a pseudo-random number generator using the hash as its seed; retrieving challenged block data from the blockchain data according to the challenge vector; sorting the challenged block data into groups according to block creator accounts; for each of the groups, generating a creator PoR proof based on associated challenged block data, at least one associated authentication tag, and an associated vector of public random elements, the associated vector of public random elements being generated by the pseudo-random number generator using a public key of a corresponding one of the block creator accounts as its seed; generating the PoR proof based on the creator PoR proof and the public key of the corresponding one of the block creator accounts for each of the groups; and incorporating the PoR proof and the PoR account identifier. Here, the for each of the groups, the associated authentication tag may be based on a private key of the corresponding one of the block creator accounts and the associated vector of public random elements.

In an embodiment, the method further includes: receiving a plurality of PoR transactions, including the PoR transaction; incorporating, by the block creator node, at most f of the PoR transactions into the new block of the blockchain, f being a tunable parameter of the blockchain.

An embodiment of the present invention provides a non-transitory computer readable medium containing processor executable instructions that, when executed by a processor, cause the processor to perform the following operations for securing a blockchain using a publicly verifiable proof of retrievability (PoR): receiving a PoR transaction having a PoR proof; determining whether the PoR proof is a verified PoR proof; and based upon determining that the PoR proof is a verified PoR proof, incorporating, by a block creator node, the PoR transaction into a new block of the blockchain.

The PoR transaction may further include a PoR account identifier. And, the operations performed by the processor may further include proposing the new block to a blockchain network. This blockchain network has a reward protocol that provides a reward to an account corresponding the PoR account identifier included in the new block based upon the new block being accepted by the blockchain network and included in the blockchain.

In an embodiment, the operations performed by the processor further include incorporating a PoR authentication tag in a block header of the new block.

The verified PoR proof may be verified using a PoR verification operation. The PoR verification operation may include: generating a hash based on a last block header and a PoR account identifier, the PoR account identifier being associated with a PoR node that generated the PoR transaction; generating a challenge vector by executing a pseudo-random number generator using the hash as its seed; retrieving challenged block data according to the challenge vector; sorting the challenged block data into groups according to block creator accounts; and for each of the groups, verifying PoR based on an associated PoR proof and an associated public key of a corresponding one of the block creator accounts.

In an embodiment, the PoR transaction is generated by a PoR generation operation that includes: retrieving blockchain data associated with the blockchain stored by a PoR creator node; generating a hash based on a last block header and a PoR account identifier of the PoR creator node; generating a challenge vector by executing a pseudo-random number generator using the hash as its seed; retrieving challenged block data from the blockchain data according to the challenge vector; sorting the challenged block data into groups according to block creator accounts; for each of the groups, generating a creator PoR proof based on associated challenged block data, at least one associated authentication tag, and an associated vector of public random elements, the associated vector of public random elements being generated by the pseudo-random number generator using a public key of a corresponding one of the block creator accounts as its seed; generating the PoR proof based on the creator PoR proof and the public key of the corresponding one of the block creator accounts for each of the groups; and incorporating the PoR proof and the PoR account identifier.

An embodiment of the present invention provides a node of a blockchain network that has a processor and a memory. The memory includes processor executable instructions that, when executed by the processor, cause the processor to perform the following operations for securing a blockchain using a publicly verifiable proof of retrievability (PoR): receiving a PoR transaction comprising a PoR proof; determining whether the PoR proof is a verified PoR proof; and based upon determining that the PoR proof is a verified PoR proof, incorporating the PoR transaction into a new block of the blockchain.

FIG. 1 illustrates a blockchain network according to an embodiment of the present invention. The blockchain network 102 is based on a peer-to-peer network where all peers (nodes) are running a blockchain client. Any peer can issue a signed transaction where the signature is verifiably linked to his account information. Upon reception of a transaction message, some peers are able to verify the transaction based on the blockchain data stored locally. Then the verified transaction is included in a transaction pool, from which some of the transactions are grouped into a block and proposed into the network. Upon reception of a block, the peers verify the block and append it to the locally stored blockchain if accepted.

Blockchain peers include three types of nodes: full nodes 104, mining nodes 105, and lightweight clients 106. Full nodes 104 maintain the complete blockchain data and validate any received transactions and blocks. Mining nodes 105 take part in the consensus protocol to generate new blocks. In embodiments, the consensus algorithm is proof of work. Mining nodes may be part of a mining pool, which is controlled by a full node 104 acting as a pool operator. Conceptually, a mining node 105 should also operate as a full node so that the transactions included in the generated blocks are correctly validated; however, that is not a requirement, and a mining node 105 only needs to keep the last block in order to mine a new block, which is unfortunately practiced by the nodes in all the conventional mining pools. Lightweight clients 106 may maintain only wallets (i.e., their accounts information and cryptocoins) and listen to transactions related to their own accounts.

The full node 104 may operate as a mining coordinator (mining pool operator) or operate independently. The full node 104 is required to validate transactions and prepare a block header for the mining process. Mining nodes 105 are only required to maintain the last block of the blockchain, but can also operate as full nodes and store maintain the entire blockchain. A node that includes proofs of its blockchain storage into a block gets a reward according to embodiments of the present invention.

Blockchain data is transmitted over the blockchain network 102. Blockchain data includes blockchain blocks. A blockchain block can include a block header and transaction data. Embodiments of the present invention extend the blockchain protocol to include a proof of retrievability (PoR) algorithm, which enables challenge-response protocols to guarantee storage of the blockchain. Embodiments also introduce a new type of transaction, a PoR transaction, and extend the block header with one extra field, a PoR tag.

Figure 2:
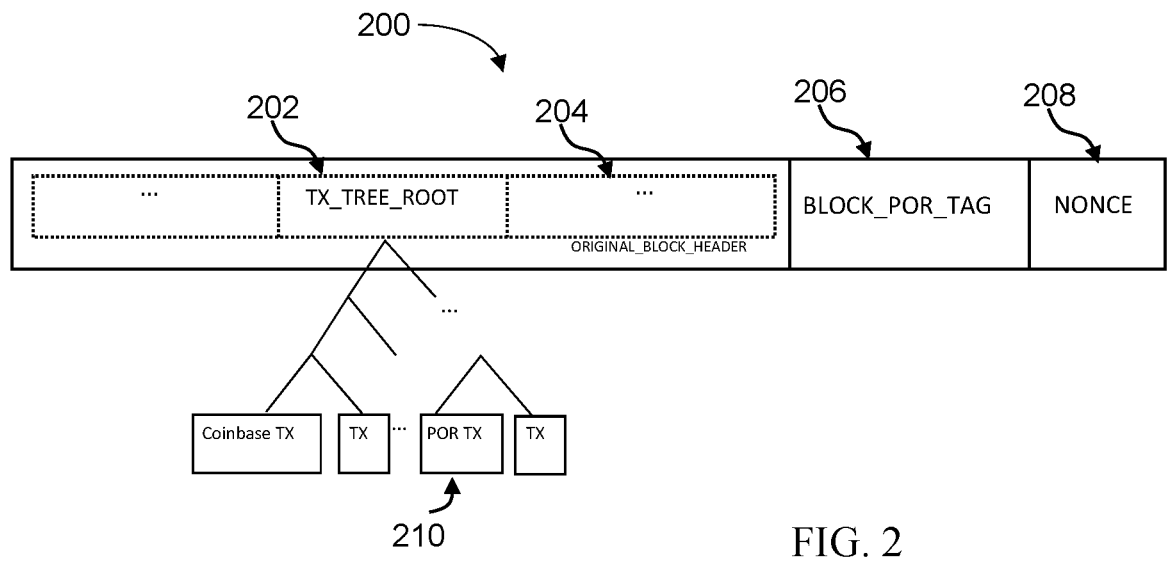
FIG. 2 illustrates a block of a blockchain according to an embodiment of the present invention.

FIG. 2 illustrates a block of a blockchain according to an embodiment of the present invention. In FIG. 2, the block 200 includes transaction data 202, an ORIGINAL_BLOCK_HEADER 204, a BLOCK_POR_TAG 206, and a NONCE 208. Blocks 200 may include other data, such as a block size, transaction counter, etc.

The ORIGINAL_BLOCK_HEADER 204 is similar to the mining block header in conventional blockchains. For example, the ORIGINAL_BLOCK_HEADER 204 includes block header information such as the previous block hash, the timestamp, the tree root of the transactions or states, mining target, etc.

The BLOCK_POR_TAG 206 is an authentication tag of a created block. In an embodiment, the authentication tag is based on a public verification construction of PoR. The authentication tag may take the form of a computational result based on the credentials of the miner and the block data (e.g., ORIGINAL_BLOCK_HEADER and the transactions of the block). The generation of the authentication tag depends on the implemented PoR scheme, which is a public PoR construction.

The NONCE 208 is a random number that the mining nodes need to find in order to solve the PoW puzzle, for example: Hash(ORIGINAL_BLOCK_HEADER|BLOCK_POR_TAG|NONCE)<Target, where Hash(•) is a cryptographic hash function and Target is the current mining target included in the ORIGINAL_BLOCK_HEADER 204.

The transaction data 202 may be in a transaction tree, such as a Merkel tree. The PoR transactions are included in the transaction tree just as the conventional blockchain transactions.

Figure 3:
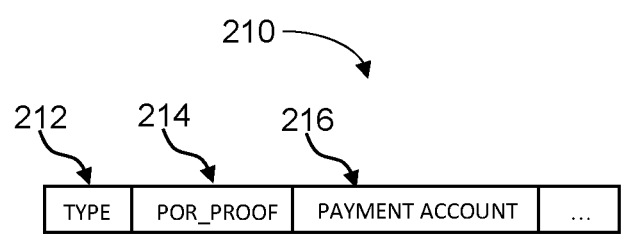
FIG. 3 illustrates a proof of retrievability transaction structure for a blockchain according to an embodiment of the present invention.

FIG. 3 illustrates a structure of a PoR transaction message according to an embodiment. A PoR transaction message 210 carries a type flag 212 that indicates which type of transaction it is (i.e., a PoR type). It also contains a PoR proof 214 proving that the PoR creating node (also called a PoR node e.g., a full node that creates the PoR proof) possesses the entire blockchain data. In addition, the PoR transaction message 210 includes payment account information 216 of the PoR creating node (e.g., a PoR account identifier, which is the account information of the full node who computes the PoR proofs and includes the proofs of the transaction) so that the PoR creating node can later collect a reward based on this PoR transaction.

In an embodiment where the blockchain uses the UTXO (Unspent transaction output) model, similar to coinbase transactions, a PoR transaction does not have a transaction input, but rather a payload of PoR proof. The output of a PoR transaction points to the account that can claim the reward if the PoR proof is valid.

In an embodiment, the block creating node (e.g., a full node 104) generates a PoR tag (e.g., BLOCK_POR_TAG 206) for the new block to mine, and adds the PoR tag in the block header. When the block creating node is a mining pool coordinator, it may add the PoR tag to the block header before the mining work is dispatched to the mining nodes.

In an embodiment, the PoR algorithm uses a public verification construction where the private key $sk_c$ of the block creating node (e.g., a full node 104 acting as a pool coordinator) is used to generate the PoR tag, and the block creating node's public key $pk_c$ is used by other nodes to verify the PoR proof of the transaction data.

In an embodiment, each block has s sectors, and the PoR algorithm challenges l blocks at a time, where s and l are public parameters in the blockchain protocol. The blockchain protocol also defines a couple of pseudo-random number generators $PRNG_x(seed)$ that is implemented on all the nodes (e.g., clients). In addition, the protocol can include an existing public verification PoR PubPoR such as the BLS or RSA construction in Hovav Shacham, Brent Waters, "Compact Proofs of Retrievability", Journal of Cryptology, 2013, the entire contents of which is hereby incorporated by reference herein. Indeed, embodiments of the present invention may be implemented using any of a variety of public verification PoR constructions, each of which have their own corresponding algorithms (e.g., tag generation), accordingly embodiments are discussed below without particular reference to any one PoR construction.

Nodes of embodiments of the present invention can execute setup and tag generation operations.

In a setup operation, Setup($pk_c$, s), the block creator generates a vector of public random elements. The vector of public elements is of length s, and is generated using a blockchain pseudo-random number generator $PRNG_x(seed)$ with the block creator's public key $pk_c$ as the seed: $[u_1^c, \ldots, u_s^c] \leftarrow PRNG_1(pk_c)$. All nodes are able to re-create this vector given the public account information of the block creator. The vector of public random elements are used to link an authentication tag to the block creator.

In a tag generation operation, Gen($bl_h$, s), the block creator generates a PoR tag. The PoR tag $\sigma_h$ is of the block data $bl_h$ at height h. A tag generation function PubPoR. Gen(•) is applied over one block of data, using the block generator's private key $sk_c$, the block data $bl^*_h$, and the vector of public random elements $\{u_1^c, \ldots u_s^c\}$ as inputs: $\sigma_h = \text{PubPoR.Gen}(sk_c, \{u_1^c, \ldots, u_s^c\}, bl^*_h)$. The block data $bl^*_h$ includes the transactions of the block and the block header, except fields BLOCK_POR_TAG and NONCE. The PoR tag $\sigma_h$ is added to the BLOCK_POR_TAG field in the block header.

The PoR of the blockchain can be generated by each full node (e.g., a full node acting as a block creator, mining pool operator, or miner of a mining pool) and can be verified by any other node. In the example that follows, the current PoR creating node F (also referred to as a PoR node, e.g., a full node 104 operating as a mining pool operator or a mining node 105 operating as a full node) has an account $acct_F$, a corresponding key pair ($pk_F$, $sk_F$), and blockchain data chain. The blockchain data chain represents the whole blockchain stored by the PoR creating node F, which includes blocks $bl_0$ to $bl_{h'}$. The last block $bl_{h'}$ that the PoR creating node F has synchronized with the blockchain network is at height h'.

The PoR creating node F executes a PoR transaction generation function, Prv($acct_F$, chain, h'), to generate PoR transaction $Tx_{PoR_F}$ using its own account data $acct_F$, blockchain data chain, and height h' as inputs. The output PoR transaction $Tx_{PoR_F}$ may take the form of POR_TRANSACTION 210. In an embodiment, the PoR transaction generation function, Prv($acct_F$, chain, h'), includes the following operations. The blockchain data chain corresponds to the whole blockchain stored by the PoR creating node F.

Here, the PoR creating node F first executes a hash function using the last block header $blhdr_{h'}$ and its account information as inputs to generate a seed r:
r=Hash($blhdr_{h'}$, $acct_F$).

Next, the PoR creating node F executes a pseudo-random generator $PRNG_x(seed)$, using the seed r, to generate the PoR challenge vector of length l: $\{(i, v_i)\} \leftarrow PRNG_2(r)$. Here, i indicates the block index (or height) in the blockchain, and $v_i$ is a random number. The a pseudo-random generator $PRNG_2(seed)$ used may be a different pseudo-random number generator than $PRNG_1(seed)$ used above and/or may be initialized with a different parameter than $PRNG_1(seed)$. The challenge vector determines which blocks are the challenge blocks. This enables embodiments to provide proofs to the blockchain data itself over randomly selected blocks with variable size.

Then for each block $bl_i$ of the existing blockchain (e.g., $bl_0$ to $bl_{h'}$) the current PoR creating node F retrieves the authentication tag $\sigma_i$ of that block $bl_i$. The current PoR creating node F groups together the blocks $bl_i$ and authentication tags $\sigma_i$ that were generated by the same block creating node c: $\{bl_i\}^c$, $\{\sigma_i\}^c$, and retrieves the constants $[u_1^c, \ldots, u_s^c]$ associated with each block creating node c by using a pseudo-random generator $PRNG_x(seed)$, with the public key $pk_c$ of each block creating node c as the seed: $[u_1^c, \ldots, u_s^c] \leftarrow PRNG_1(pk_c)$.

The PoR creating node F then computes a PoR proof $prf_c$ for each group of blocks $\{bl_i\}^c$. In and embodiment, the PoR creating node F uses the PoR proof generation function PubPoR.Prv(•) to generate each PoR proof $prf_c$, and which uses as its inputs the constants $\{u_1^c, \ldots, u_s^c\}$ associated with a corresponding block creating node c, the PoR challenge vector $\{(i, v_i)\}$, data from the corresponding group of blocks $\{bl^*_i\}^c$, and the corresponding group of authentication tags $\{\sigma_i\}^c$:
$prf_c = \text{PubPoR.Prv}([u_1^c, \ldots, u_s^c], \{(i, v_i)\}^c, \{bl^*_i\}^c, \{\sigma_i\}^c)$.

The PoR creating node F then generates its final proof $prf_F$ as data structure (e.g., an array) including its public key $pk_c$ and the calculated PoR proofs $prf_c$ for each group of blocks: $prf_F=\{(pk_c, prf_c)\}$. The PoR creating node F includes the final $prf_F$ in the proposed PoR transaction $Tx_{PoR_F}$ along with its account information $acct_F$.

The PoR transaction $Tx_{PoR_F}$ can then be incorporated into a new block of the blockchain along with the PoR tag header extension. If the PoR creating node F is also a block creating node c, then it may include the PoR transaction $Tx_{PoR_F}$ in a block (e.g., by building a tree such as a Merkle tree or Patricia tree) along with other transactions (e.g., coinbase transactions). However, the PoR creating node F is not required to be the block creating node c. For example, the PoR creating node F may be a miner node 105 operating in a mining pool run by a full node 105 acting as a mining operator. Here the mining operator is the block creating node c, and it determines whether to include the PoR transaction $Tx_{PoR_F}$ in a block. In an embodiment, a block creating node c only includes the PoR transaction $Tx_{PoR_F}$ in a block if its PoR proof $prf_F$ is verified.

Any node (including full nodes 104, mining nodes 105, and light nodes 106) can verify a PoR proof that corresponds to blockchain data up to block height h' because they should keep the chain of block headers up to their last synchronized blockchain height h'. While the following description is with reference to a new PoR proof, a verifying node V can verify any PoR proof (whether it is the most recent or an older proof) as long as it has the complete block header information up to the blockchain height where the PoR proof was found. Verifications of a new PoR proof can be used by the block creator node c to determine whether or not to include the associated PoR transaction $Tx_{PoR_F}$ in a block, regardless of whether those verifications were performed by the block creator node c itself or any other node.

A verifying node V executes a proof verifying function, $Vrf(prf_F, h')$, to verify the PoR proof $prf_F$, which corresponds to the blockchain data up to (and including) block height h'. The PoR proof $prf_F$ being verified is a PoR proof included in a PoR transaction $Tx_{PoR_F}$ (e.g., a proposed PoR transaction $Tx_{PoR_F}$ for inclusion in a new block). The PoR proof $prf_F$ was created by the PoR creating node F.

The verifying node V first recreates the challenge vector $\{(i, v_i)\}$ using blockchain pseudo-random number generator $PRNG_x$(seed), with the height h' block header $blhdr_{h'}$ and the account $acct_F$ of the PoR creating node F as the seed: $\{(i, v_i)\} \leftarrow PRNG_2(Hash(blhdr_{h'}, acct_F))$. That is, the challenge vector can be recomputed from the previous block headers and the proover's account (which is included in the PoR transaction). The indices in the challenge vector are used to retrieve the block headers to get the authentication tag.

The verifying node V then groups the challenged blocks according to the block creator accounts $acct_c$. For example, the verifying node V may group the authentication tags from the block headers corresponding to blocks identified by the challenge vector according to the block creator. The verifying node V node verifies the PoR of the challenged group of blocks created by $acct_c$ using the corresponding public key $pk_c$ and the proof $prf_c$, via the PoR verification function: $PubPoR.Vrf(pk_c, prf_c, [u_1^c, \ldots, u_s^c], \{(i, v_i)\}^c, \{\sigma_i\}^c)$. The PoR verification function $PubPoR.Vrf(\bullet)$ is executed for each group. If The PoR verification function $PubPoR.Vrf(\bullet)$ returns a verification confirmation (true or false) for each group, then the verifying node V determines that the PoR proof $prf_F$ created by the PoR creating node F is valid.

The verifying node V may report its verification results to other nodes, such as the block creating node c, which will then determine that the corresponding PoR transaction $Tx_{PoR_F}$ is valid (making it a verified PoR proof).

A block can maximally include f validated PoR transactions, f being a tunable parameter of the blockchain network.

Once a block is accepted by the network and included in the blockchain, the nodes whose PoR transactions are included in the accepted block are able to claim their reward. The reward protocol may operate similar to how nodes are rewarded for conventional mining (or contributing to mining). Thus the blockchain protocol motivates at least f full nodes to maintain the whole blockchain.

Figure 4:
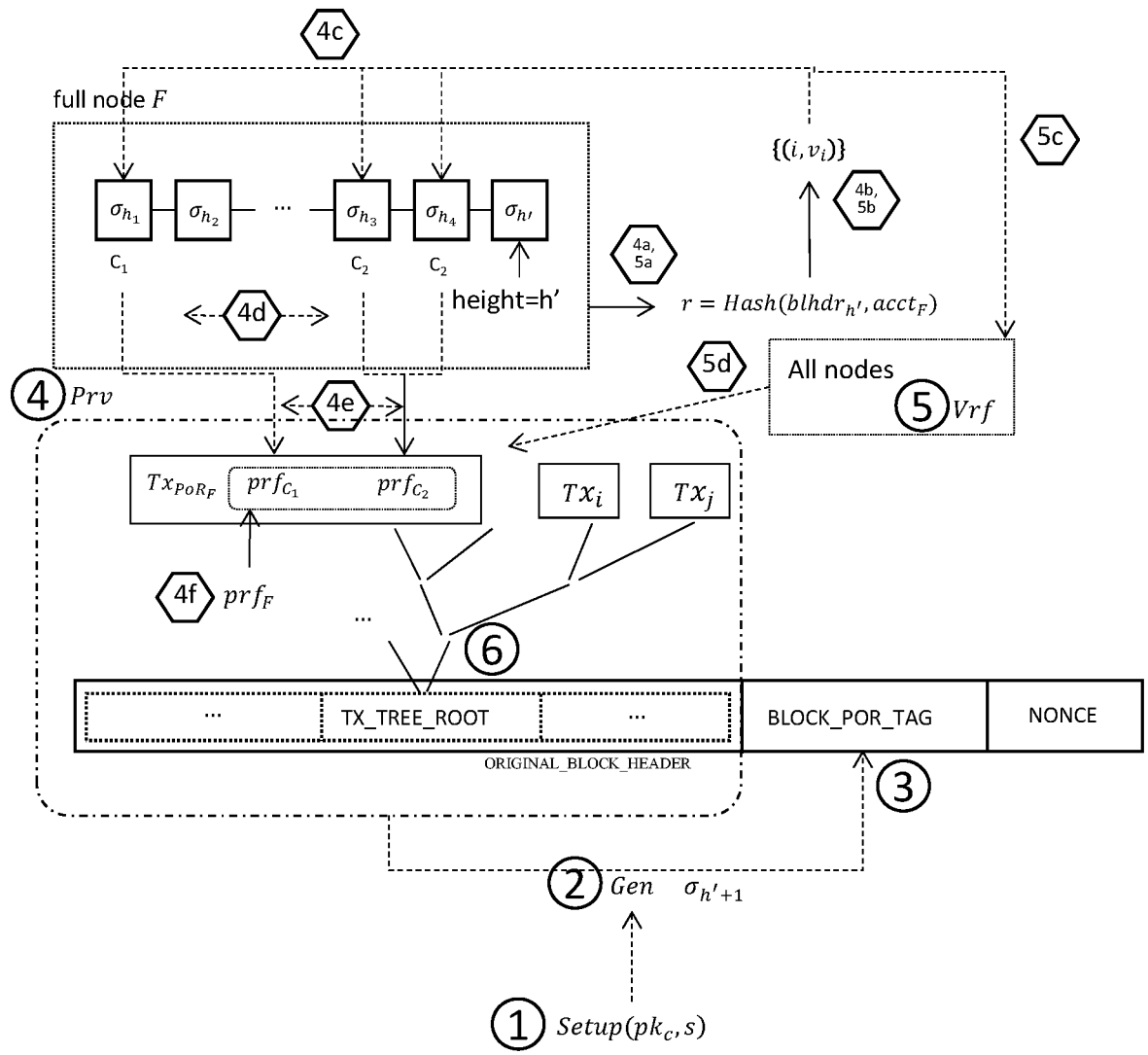
FIG. 4 illustrates a workflow for generating and including proof of retrievability proofs in a block for a blockchain according to an embodiment of the present invention.

FIG. 4 illustrates a workflow of a method for generating PoR proofs and including PoR proofs in a block.

Operation 1—Setup($pk_c$, s): A vector of public random elements is generated of length s using the block creator c's public key: $\{u_1^c, \ldots, u_s^c\} \leftarrow PRNG_1(pk_c)$. All nodes are able to create this vector given the public account information of the block creator c.

Operation 2—Gen($bl_h$, s): A block creator generates a PoR tag $\sigma_h$ of the block data $bl_h$ at height h using a tag generation function: $\sigma_h = PubPoR.Gen(sk_c, \{u_1^c, \ldots, u_s^c\}, bl^*_h)$. The block data $bl^*_h$ includes the transactions of the block and the block header, except fields BLOCK_POR_TAG and NONCE. Height h corresponds to the height of the presently generated block. If the prior synchronized block chain height is h', then h=h'+1 and $\sigma_h = \sigma_{h'+1}$. The private key $sk_c$ is the private key of the block creator node c.

Operation 3: The PoR tag $\sigma_h$ is added to the BLOCK_POR_TAG field in the block header for the block being created.

Operation 4—Prv($acct_F$, chain, h'): A PoR creator generates a PoR transaction $Tx_{PoR_F}$ using its account $acct_F$ and blockchain data chain stored by the full node, which is at height h'. This operation may include the following sub-operations.

Operation 4a: The PoR creator generates a hash r of the last block header $blhdr_{h'}$ and its account information $acct_F$: $r = Hash(blhdr_{h'}, acct_F)$.

Operation 4b: The PoR creator generates a PoR challenge vector $\{(i, v_i)\}$ of length l by using the hash r as a seed for a pseudo-random number generator: $\{(i, v_i)\} \leftarrow PRNG_2(r)$. For the PoR challenge vector $\{(i, v_i)\}$, i indicates the block index (or height) in the blockchain, and $v_i$ is a random number.

Operation 4c: The PoR creator retrieves the authentication tags $\sigma_i$ according to the PoR challenge vector $\{(i, v_i)\}$.

Operation 4d: The PoR creator groups the blocks and authentication tags that are generated by the same node: $\{bl^*_i\}^c, \{\sigma_i\}^c$.

Operation 4e: The PoR creator computes the PoR proof $prf_{ci}$ for each group of blocks: $prf_c = PubPoR.Prv(\{u_1^c, \ldots, u_s^c\}, \{(i, v_i)\}^c, \{bl^*_i\}^c, \{\sigma_i\}^c)$, where $PubPoR.Prv(\bullet)$ is the PoR proof generation function that operates on the public random elements vector, the challenge vector, the block data, and the authentication tags to generate the PoR proofs.

Operation 4f: The PoR creator then includes the proof $prf_F = \{pk_c, prf_c \ldots\}$ in a PoR transaction $Tx_{PoR_F}$ along with its account information $acct_F$.

Operation 5—Vrf($prf_F$, h'): A PoR verifier verifies the PoR proof $prf_F$ regarding to the chain data up to block height h'.

Operation 5a: The PoR verifier recreates a hash r using the last block header $blhdr_{h'}$ and the PoR creator's account information $acct_F$: $r = Hash(blhdr_{h'}, acct_F)$.

Operation 5b: The PoR verifier recreates the challenge vector $\{(i, v_i)\}$: $\{(i, v_i)\} \leftarrow PRNG_2(Hash(blhdr_{h'}, acct_F))$.

Operation 5c The PoR verifier groups the challenged blocks according to the block creator accounts $acct_c$, and retrieves the corresponding public key $pk_c$ and the proof $prf_c$.

Operation 5d: The PoR verifier verifies the PoR of the blocks created by each account $acct_c$ using the corresponding public key $pk_c$ and the proof $prf_c$, via the PoR verification function: PubPoR.Vrf ($pk_c$, $prf_c$). If all verifications are successful a verification is confirmed and the PoR transaction can be accepted into the block.

Operation 6: If the PoR transaction is accepted by a block creator, it is included in a block by building a tree (such as Merkle tree or Patricia tree) over the validated PoR transactions along with the other transactions.

The invention incentivizes the nodes to invest their storage resources to store the full blockchain data. As a result, the security level of the blockchain is enhanced.

Figure 5:
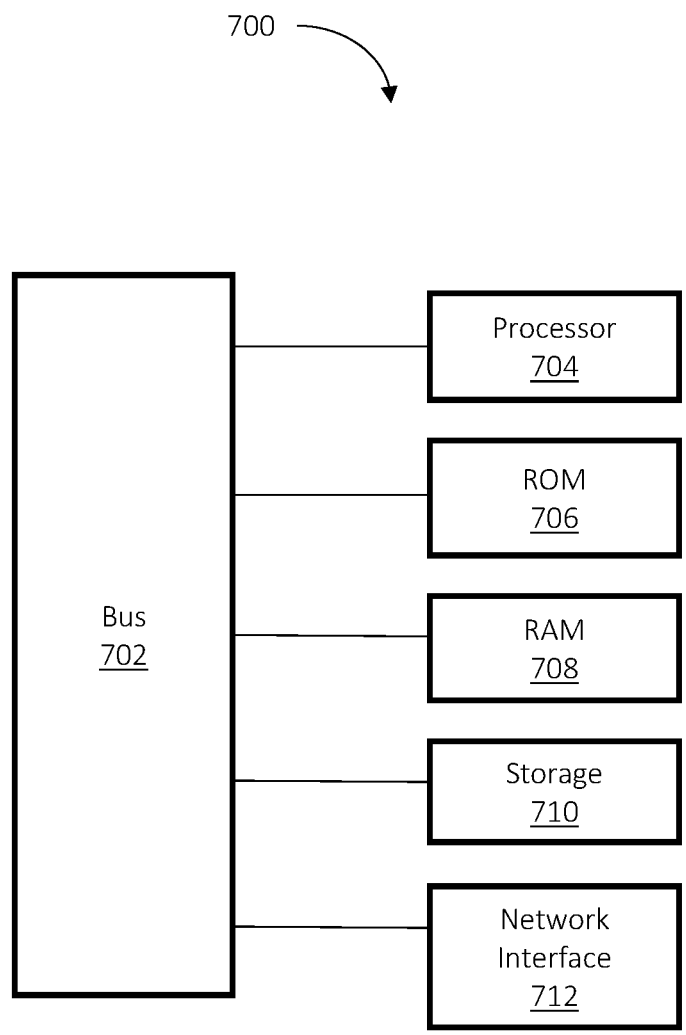
FIG. 5 illustrates a block diagram of a processing system according to an embodiment of the present invention.

FIG. 5 is a block diagram of a processing system according to one embodiment. The processing system 700 can be used to implement the protocols, devices, mechanism, systems and methods described above. The processing system 700 includes a processor 704, such as a central processing unit (CPU) of a computing device or a distributed processor system. The processor 704 executes processor executable instructions comprising embodiments of the system for performing the functions and methods described above. In embodiments, the processor executable instructions are locally stored and accessed from a non-transitory computer readable medium, such as storage 710, which may be a hard drive or flash drive. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securing a blockchain and incentivizing the storage of blockchain data using a publicly verifiable proof of retrievability (PoR), the method comprising:
   receiving a PoR transaction comprising a PoR proof;
   determining whether the PoR proof is a verified PoR proof; and
   based upon determining that the PoR proof is a verified PoR proof, incorporating, by a block creator node, the PoR transaction into a new block of the blockchain,
   wherein the verified PoR proof is verified using a PoR verification method, which comprises:
   generating a hash based on a last block header and a PoR account identifier, the PoR account identifier being associated with a PoR node that generated the PoR transaction;
   generating a challenge vector by executing a pseudo-random number generator using the hash as its seed;
   retrieving PoR authentication tags of the challenged block headers according to the challenge vector;
   sorting PoR authentication tags of the challenged block headers into groups according to block creator accounts; and
   for each of the groups, verifying PoR based on an associated PoR proof and an associated public key of a corresponding one of the block creator accounts.

2. The method of claim 1, wherein the PoR transaction further comprises the PoR account identifier, and wherein the method further comprises:
   proposing the new block to a blockchain network, the blockchain network having a reward protocol that provides a reward to an account corresponding to the PoR account identifier included in the new block based upon the new block being accepted by the blockchain network and included in the blockchain.

3. The method of claim 1, further comprising incorporating a PoR authentication tag in a block header of the new block.

4. The method of claim 3, wherein the PoR authentication tag was generated using a private key of the block creator node, a vector of public random elements, and data of the new block.

5. The method of claim 4, wherein the vector of public random elements was generated by a pseudo-random number generator using a public key of the block creator node as its seed.

6. The method of claim 1, wherein the PoR transaction was generated by a PoR generation method comprising:
   retrieving blockchain data associated with the blockchain stored by a PoR creator node;
   generating a PoR hash based on a last block header and a PoR account identifier of the PoR creator node;
   generating a PoR challenge vector by executing an associated pseudo-random number generator using the PoR hash as its seed;
   retrieving challenged block data from the blockchain data according to the PoR challenge vector;
   sorting the challenged block data into challenge groups according to block creator accounts;
   for each of the challenge groups, generating a creator PoR proof based on associated challenged block data, at least one associated authentication tag, and an associated vector of public random elements, the associated vector of public random elements being generated by the associated pseudo-random number generator using a respective public key of a corresponding one of the block creator accounts as its seed;

generating the PoR proof based on the creator PoR proof and the associated public key of the corresponding one of the block creator accounts for each of the challenge groups; and incorporating the PoR proof and the PoR account identifier.

7. The method of claim 6, wherein for each of the groups, the associated authentication tag is based on a private key of the corresponding one of the block creator accounts and the associated vector of public random elements.

8. The method of claim 1 further comprising:
receiving a plurality of PoR transactions, including the PoR transaction;
incorporating, by the block creator node, at most f of the PoR transactions into the new block of the blockchain, f being a tunable parameter of the blockchain.

9. A non-transitory computer readable medium comprising processor executable instructions that, when executed by a processor, cause the processor to perform the following operations for securing a blockchain using a publicly verifiable proof of retrievability (PoR):
receiving a PoR transaction comprising a PoR proof;
determining whether the PoR proof is a verified PoR proof; and
based upon determining that the PoR proof is a verified PoR proof, incorporating, by a block creator node, the PoR transaction into a new block of the blockchain,
wherein the verified PoR proof is verified using a PoR verification operation, which comprises:
generating a hash based on a last block header and a PoR account identifier, the PoR account identifier being associated with a PoR node that generated the PoR transaction;
generating a challenge vector by executing a pseudo-random number generator using the hash as its seed;
retrieving challenged block data according to the challenge vector;
sorting the challenged block data into groups according to block creator accounts; and
for each of the groups, verifying PoR based on an associated PoR proof and an associated public key of a corresponding one of the block creator accounts.

10. The non-transitory computer readable medium of claim 9, wherein the PoR transaction further comprises the PoR account identifier, and wherein the operations further comprise:
proposing the new block to a blockchain network, the blockchain network having a reward protocol that provides a reward to an account corresponding the PoR account identifier included in the new block based upon the new block being accepted by the blockchain network and included in the blockchain.

11. The non-transitory computer readable medium of claim 9, wherein the operations further comprise incorporating a PoR authentication tag in a block header of the new block.

12. The non-transitory computer readable medium of claim 9, wherein the PoR transaction is generated by a PoR generation operation comprising:
retrieving blockchain data associated with the blockchain stored by a PoR creator node;
generating a PoR hash based on a last block header and a PoR account identifier of the PoR creator node;
generating a PoR challenge vector by executing an associated pseudo-random number generator using the hash as its seed;
retrieving challenged block data from the blockchain data according to the PoR challenge vector;
sorting the challenged block data into challenge groups according to block creator accounts;
for each of the challenge groups, generating a creator PoR proof based on associated challenged block data, at least one associated authentication tag, and an associated vector of public random elements, the associated vector of public random elements being generated by the associated pseudo-random number generator using a respective public key of a corresponding one of the block creator accounts as its seed;
generating the PoR proof based on the creator PoR proof and the associated public key of the corresponding one of the block creator accounts for each of the challenge groups; and
incorporating the PoR proof and the PoR account identifier.

13. A node of a blockchain network comprising a processor and a memory, the memory comprising processor executable instructions that, when executed by the processor, cause the processor to perform the following operations for securing a blockchain using a publicly verifiable proof of retrievability (PoR):
receiving a PoR transaction comprising a PoR proof;
determining whether the PoR proof is a verified PoR proof; and
based upon determining that the PoR proof is a verified PoR proof, incorporating the PoR transaction into a new block of the blockchain,
wherein the verified PoR proof is verified using a PoR verification method, which comprises:
generating a hash based on a last block header and a PoR account identifier, the PoR account identifier being associated with a PoR node that generated the PoR transaction;
generating a challenge vector by executing a pseudo-random number generator using the hash as its seed;
retrieving PoR authentication tags of the challenged block headers according to the challenge vector;
sorting PoR authentication tags of the challenged block headers into groups according to block creator accounts; and
for each of the groups, verifying PoR based on an associated PoR proof and an associated public key of a corresponding one of the block creator accounts.

* * * * *